United States Patent Office 3,175,285
Patented Mar. 30, 1965

3,175,285
METHOD OF TREATING METAL POWDERS FOR BRAZING PURPOSES
Arthur T. Cape, Monterey, Calif., assignor to Coast Metals, Inc., Little Ferry, N.J., a corporation of Delaware
No Drawing. Filed Oct. 4, 1963, Ser. No. 313,745
9 Claims. (Cl. 29—496)

This application is a continuation-in-part of my co-pending application, Serial No. 141,955, filed October 2, 1961, and now abandoned.

This invention relates generally to the treatment of metal powders for the purpose of improving the flow properties of such powders when used for brazing various stainless steels, etc.

In my co-pending application, Serial No. 313,752, filed October 4, 1963, I have disclosed the treatment of certain brazing alloy powders with aqueous solutions containing hydrofluoric acid and a small amount of a compound, such as a fluoride or fluoborate.

Although treatment with such an aqueous solution has been found highly effective, in the case of certain brazing alloys, where used for brazing certain steels and alloys, I have found that this treatment is not effective, to any great extent, in connection with other brazing materials or powders, when used for brazing certain materials.

I have found, for example, that in brazing Rene #41 with a manganese-nickel-cobalt brazing alloy, that excellent flow of the brazing alloy was obtained, if the brazing alloy, in powder form, is first treated or pickled with an aqueous solution of hydrochloric, sulphuric or nitric acid.

Where the brazing alloy is a manganese-base brazing alloy, as for example, the manganese-nickel-cobalt brazing alloy to which reference is made in the preceding paragraph, or where the brazing alloy is a copper-base brazing alloy, such as a copper-manganese alloy, the aqueous solution may contain from about 1% to about 10% of the acid, but preferably a 3% solution is used in most instances, and the time of treatment or pickling in this solution may vary from a few minutes up to one-half hour or longer, depending upon the acid strength of the solution. In most cases, the brazing powder or material, after such treatment, is not washed or rinsed, but the solution is merely decanted from the powder and the powder is permitted to dry. If the solution is too strong, or if an excess of the solution is used, the treated powder, in some instances, is rinsed to remove the excess of acid, but this rinsing is rarely necessary or desired.

The dried powder is then mixed with an acrylic resin or any other suitable binder, and is then used for brazing purposes.

The improvement in the flow properties of the brazing alloys thus treated is difficult to explain, but is probably due to the fact that the acid is absorbed by the powder metal particles, instead of being superficially adhered thereto. In any event, the acid is so absorbed by the particles, that when the powder is used in a brazing operation, the acid is not found in the brazed joint in any measurable amount. Moreover, the improvement in flow properties during brazing is very substantial, as evidenced by the appearance and character of the brazed joints.

The proportion or ratio between the weight of the solution used and weight of the powder treated may vary considerably, but in most cases, this variation may be from about 2:1 to about 10:1.

The brazing is usually performed in an argon or hydrogen atmosphere, and the results will vary to some extent, depending on the nature of the brazing atmosphere.

The method is also applicable to the brazing of No. 347 Stainless Steel with manganese-nickel-cobalt, but in this case, the joints must be tighter, in order to retain the melted brazing material.

The invention is also applicable to various brazing alloys, other than manganese-nickel-cobalt alloys and copper-manganese alloys, such, for example, as cobalt-base brazing alloys, nickel-base brazing alloys, and iron-base brazing alloys. In the treatment of such alloys, other than manganese-nickel-cobalt alloys and copper-manganese alloys, the solution may contain from about 1% to about 25% of the acid.

In the brazing, for example, in a hydrogen atmosphere, of No. 347 Stainless Steel with Colmony #6, a nickel-base brazing alloy, the brazing alloy, before being used, is treated with an aqueous solution containing 25% hydrochloric acid.

The invention is applicable, in the brazing, in a hydrogen atmosphere, of No. 347 Stainless Steel with cobalt-base brazing alloys, which have been treated with aqueous hydrochloric acid solutions of a strength of from about 1% to about 5% of hydrochloric acid.

In most cases, hydrochloric acid solutions are effective.

In the treatment of copper-manganese brazing alloys, solutions containing from about 6 to about 10% nitric acid are effective to enhance the flow properties of the alloy.

In joining certain stainless steels, such as AMS 350 Stainless to 321 Stainless, in hydrogen, at 1700° F., by means of a copper-manganese alloy containing 52.5% copper, 37.5% manganese, 9% nickel, and 1% MnB, the treatment of the brazing material with a nitric acid solution of the strength above described produced excellent results.

In the brazing of Rene #41 in both an argon and a hydrogen atmosphere, with a manganese-nickel-cobalt brazing alloy, the treatment of the brazing alloy with a 3% solution of sulphuric acid produced an excellent braze.

In joining 350 Stainless to 350 Stainless with a brazing alloy containing 63.75% copper, 21.1% manganese, 5% nickel, 10% cobalt, and 0.15% boron (as manganese-boron), the treatment of the brazing material with a nitric acid solution containing from 6% to 10% nitric acid produced excellent results.

Although it is preferred that the treatment consist of applying the solution to the brazing powder in a receptacle containing the powder, allowing the powder to remain in the solution for a period of time depending upon the acid strength of the solution, decanting the solution from the receptacle when necessary, and permitting the powder to dry, it is to be understood that various other procedures may be used, for treating the powder, and which methods come within the meaning or scope of the word "treatment," or "treating" as used in the specification and claims. Some of these other procedures for treatment are described in my co-pending application, Serial No. 313,752.

Other "treatment" procedures would include placing the powder in the solution, instead of the solution in the powder, or the powder could be dropped from one hopper into another, and while dropping, the solution could be sprayed through the falling powder, or the solution could be dropped as a "rain" and the powder sprayed through the "rain," or the solution could be charged through the powder (the powder being in a container having a perforated bottom) and the solution drained through the perforations. All of these variations in procedure are comprised within the general term "treatment," as used in the specification and claims, the important consideration being that the solution is absorbed by the powder as a result of the treatment.

It will be understood that various changes may be made in the solutions and treatments, without departing from the spirit of the invention, or the scope of the appended claims.

Having thus described my invention, I claim:

1. The method of enhancing the flow properties of metallic powder brazing compositions which consists in treating the surfaces of the powder particles with an aqueous solution selected from the group consisting of aqueous solutions of hydrochloric, sulphuric and nitric acids, said solutions containing from about 1% to about 25% of the acid, whereby the particles are coated with the solution and the solution is absorbed by the powder, and then drying the powder.

2. The method, as recited in claim 1, in which the time of treatment varies in accordance with the strength of the solution.

3. The method, as recited in claim 1, in which the solution is decanted from the powder after the treatment and the powder is permitted to dry.

4. The method, as recited in claim 3, in which the dried powder is mixed with an acrylic resin or other suitable binder, and is then used for brazing purposes.

5. The method, as recited in claim 1, in which the proportion or ratio between the weight of the solution used and the weight of the powder treated varies from about 2:1 to about 10:1.

6. The method of brazing Rene #41 with a manganese-nickel-cobal brazing alloy, which comprises treating the alloy in powder form, prior to brazing, with an aqueous solution containing about 3% of sulphuric acid, whereby the particles of powder are coated with the solution and the solution is absorbed by the powder, and then drying the powder.

7. The method of brazing No. 347 Stainless Steel with a cobalt-base brazing alloy, which comprises treating the alloy in powder form, prior to brazing, with an aqueous solution of hydrochloric acid containing from about 1% to about 5% hydrochloric acid, whereby the particles of powder are coated with the solution and the solution is absorbed by the powder, and then drying the powder.

8. The method of enhancing the flow properties of a metallic powder brazing composition selected from the group consisting of manganese-base, copper-base, cobalt-base, nickel-base and iron-base brazing alloys, which consists in treating the powder with an aqueous solution selected from the group consisting of aqueous solutions of hydrochloric, sulphuric and nitric acids, and containing from about 1% to about 10% of the acid, whereby the particles of powder are coated with the solution and the solution is absorbed by the powder, and then drying the powder.

9. The method of enhancing the flow properties of a metallic powder brazing composition selected from the group consisting of cobalt-base, nickel-base and iron-base brazing alloys, which consists in treating the powder with an aqueous solution selected from the group consisting of aqueous solutions of hydrochloric, sulphuric and nitric acids, and containing from about 1% to about 25% of the the acid, whereby the particles of powder are coated with the solution and the solution is absorbed by the powder, and then drying the powder.

References Cited by the Examiner
UNITED STATES PATENTS

| | | | |
|---|---|---|---|
| 1,918,197 | 7/33 | Sebell | 29—496 X |
| 2,133,294 | 10/38 | Gordon | 29—496 |
| 2,144,332 | 1/39 | Glaser | 29—496 |
| 2,310,568 | 2/43 | Atlee et al. | 29—495 X |
| 2,807,561 | 9/57 | Nelson | 29—496 X |
| 2,842,841 | 7/58 | Schnable et al. | 29—495 |
| 3,069,765 | 12/62 | Simpelaar | 29—494 X |
| 3,079,251 | 2/63 | Donnelly et al. | 29—495 X |

JOHN F. CAMPBELL, *Primary Examiner.*